C. PFLASTERER.
REVOLVING CHRISTMAS TREE AND FERRIS WHEEL.
APPLICATION FILED APR. 6, 1910.
985,545.
Patented Feb. 28, 1911.
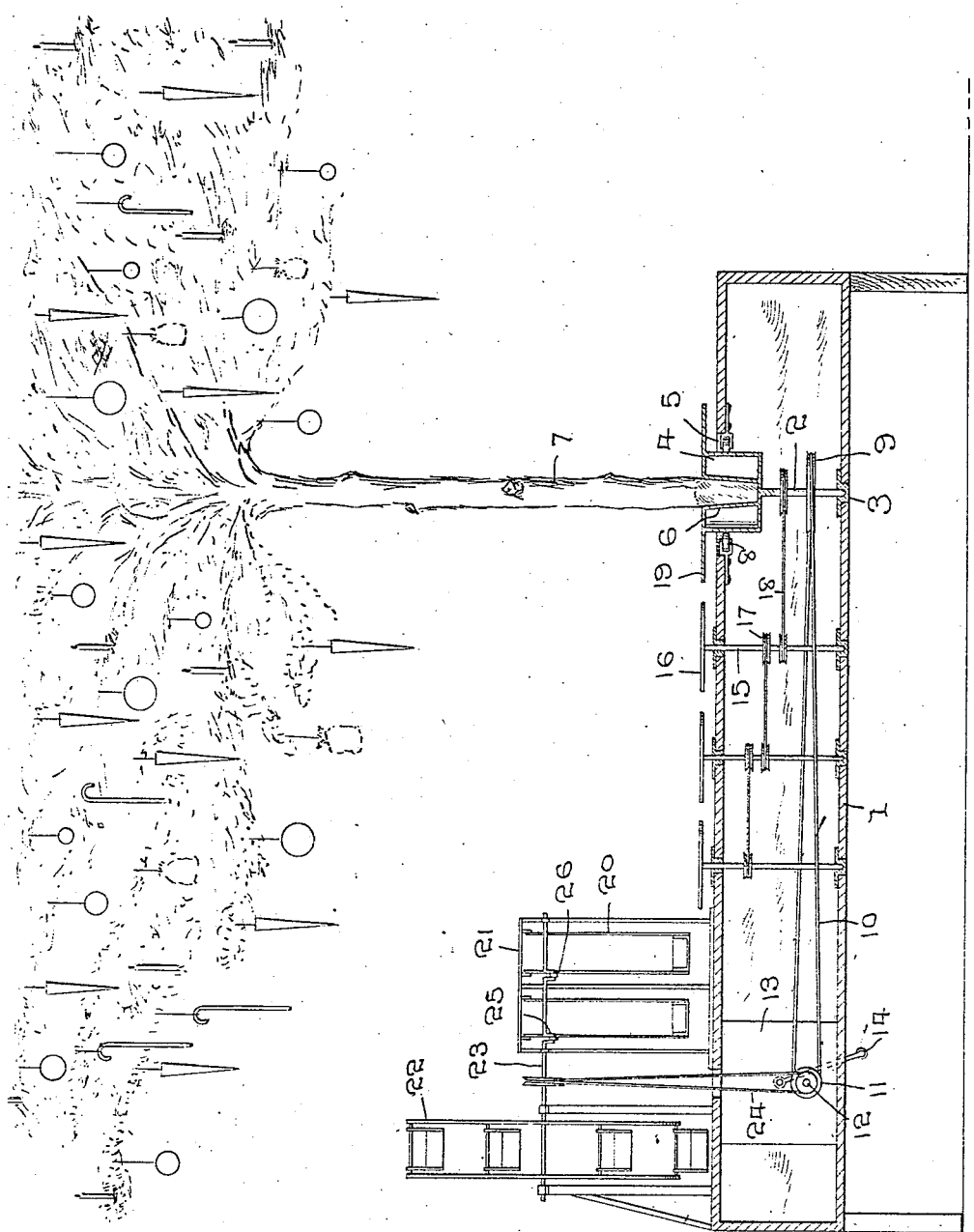
WITNESSES:
Thos. W. Riley
B. D. Christie
INVENTOR
C. Pflasterer
BY
W. J. Fitzgerald & Co.
Attorneys

UNITED STATES PATENT OFFICE.

CHARLES PFLASTERER, OF VALMEYER, ILLINOIS.

REVOLVING CHRISTMAS TREE AND FERRIS WHEEL.

985,545.

Specification of Letters Patent. Patented Feb. 28, 1911.

Application filed April 6, 1910. Serial No. 553,828.

*To all whom it may concern:*

Be it known that I, CHARLES PFLASTERER, a citizen of the United States, residing at Valmeyer, in the county of Monroe and State of Illinois, have invented certain new and useful Improvements in Revolving Christmas Trees and Ferris Wheels; and I do hereby declare the following to be a full, clear, and exact description of the invention, such as will enable others skilled in the art to which it appertains to make and use the same.

My invention relates to new and useful improvements in displaying devices and my object is to provide means for mounting a tree and toys in such manner as to display the same.

A further object is to provide means for rotating said tree and the toys, and a still further object is to provide suitable means for operating the devices upon which the tree and toys are secured.

Other objects and advantages will be hereinafter referred to and more particularly pointed out in the specification and claim.

The figure is a sectional view through a suitable support showing the manner of mounting and operating the various devices.

Referring to the drawings in which similar reference numerals designate corresponding parts throughout the several views, 1 indicates a frame which is constructed in any preferred manner and preferably hollow and extending vertically through said frame is a shaft 2, the lower end of said shaft being mounted in a suitable bearing 3, while the upper end thereof is provided with a drum 4, which drum extends through an opening 5 in the upper portion of the frame. The drum is provided at its central portion with a socket 6, in which is adapted to be disposed the trunk of a tree 7 so that when the drum is rotated, the tree will be likewise rotated.

The opening 5 is larger than the drum 4 and the drum is held in proper alinement by means of friction rollers 8, which are carried in suitable brackets attached to that portion of the frame surrounding the drum, the rollers engaging the outer surface of the drum and in this manner, the drum is not only held in proper alinement but will more freely rotate.

The shaft 2 has a sheave 9 attached thereto, around which extends a driving belt 10, the opposite end of the belt being directed around a pulley 11, which pulley is in turn secured to the shaft 12 of any suitable form of spring motor 13 and by properly winding the motor through the medium of the crank 14, the drum and tree mounted thereon will be continuously rotated for a considerable length of time.

In addition to displaying the tree 7, a plurality of shafts 15 may be mounted in the frame, the upper ends of said shafts having pedestals 16 attached thereto upon which toys or other articles may be placed when being displayed. In order to rotate said shafts, they are connected to the shaft 2 by means of pulleys 17 and belts 18, so that said shafts and pedestals will be rotated simultaneously with the drum and tree. The upper end of the drum 4 may also be provided with a platform 19, upon which various articles to be displayed may be mounted. If desired, miniature swings 20 may be mounted in suitable frames 21 and positioned upon the frame 1 and in connection with said swings may be provided a miniature Ferris wheel 22, said wheel and swings being controlled from a shaft 23, which shaft is connected to the shaft 12 of the motor through the medium of a belt 24 and it will be readily seen that when the motor is in operation, the swings and Ferris wheel will likewise be operated. The swings 20 are moved back and forth by providing the shaft 23 with cranks 25, links 26 extending from said cranks to the swings and by placing dolls in the swings and toys or other articles in the baskets of the Ferris wheel, an attractive display will be provided. It will likewise be seen that by trimming the tree in the usual manner, the same may be placed in a show window and the effect thereof rendered very attractive by rotating the tree.

What I claim is:

In a revolving tree holder, the combination with a frame, of a vertical shaft pivotally mounted at its lower end in said frame, means for rotating said shaft, a hollow cylinder secured on the upper end of said shaft and in axial alinement therewith, a display table secured on the top of said cylinder and extending out beyond the walls of the same, a tube extending through said table and to the bottom surface of said cylinder, and a plurality of friction rollers secured in said frame and so positioned to serve as journal for said cylinder, whereby the cylinder and table will be relieved of the weight of the tree and the projecting portion of the table serve as a guard to prevent objects becoming entangled in the rollers.

In testimony whereof I have signed my name to this specification in the presence of two subscribing witnesses.

CHARLES PFLASTERER.

Witnesses:
GEORGE M. TOLIN,
PHIL P. BREMSER.